United States Patent
McGehee et al.

(10) Patent No.: US 6,749,821 B1
(45) Date of Patent: Jun. 15, 2004

(54) PROCESS FOR THE PURIFICATION OF INERT GASES

(75) Inventors: James F. McGehee, Milan (IT); John R. Richmond, Churt (GB); Kaoru Tegawa, Kanagawa (JP); Yoshiki Nakano, Kanagawa (JP)

(73) Assignee: UOP LLC, Des Plaines, IL (US)

( * ) Notice: Subject to any disclaimer, the term of this patent is extended or adjusted under 35 U.S.C. 154(b) by 142 days.

(21) Appl. No.: 10/011,353

(22) Filed: Dec. 3, 2001

(51) Int. Cl.[7] .................................................. B01J 8/00
(52) U.S. Cl. .................................... 423/245.3; 528/272
(58) Field of Search ............................. 423/245.3, 351; 528/272, 274

(56) References Cited

U.S. PATENT DOCUMENTS

| | | | |
|---|---|---|---|
| 4,064,112 A | 12/1977 | Rothe et al. | 260/75 M |
| 4,108,971 A | 8/1978 | Takumi et al. | 423/428 |
| 4,301,033 A | 11/1981 | Takumi et al. | 252/448 |
| 4,460,762 A | 7/1984 | Gaymans et al. | 528/335 |
| 5,540,868 A | 7/1996 | Stouffer et al. | 264/13 |
| 5,547,652 A | 8/1996 | Ghisolfi et al. | 423/245.3 |
| 5,612,011 A | 3/1997 | Ghisolfi et al. | 423/245.3 |
| 5,633,018 A | 5/1997 | Stouffer et al. | 425/8 |
| 5,708,124 A | 1/1998 | Al Ghatta et al. | 528/308.3 |
| 5,744,074 A | 4/1998 | Stouffer et al. | 264/8 |
| 5,851,948 A * | 12/1998 | Chuang et al. | 502/314 |

FOREIGN PATENT DOCUMENTS

| | | | |
|---|---|---|---|
| EP | 0 222 714 B1 | 3/1992 | C08G/63/78 |
| JP | 20885/71 | 6/1971 | |

OTHER PUBLICATIONS

Article "Nylon 6 Polymerization in the Solid State" by R.J. Gaymans et al., *Journal of Applied Polymer Science*, vol. 27, 2515–2526 (1982).

Article "Purification of Industrial Vapor–Gas Discharges and Wastewaters by Vapor–Phase Catalytic Oxidation" by E.V. Kuznetsova et al., Khimicheskya Promyshlennost, vol. 19, No. 10 (1987) pp 16–18.

* cited by examiner

Primary Examiner—Stanley S. Silverman
Assistant Examiner—Maribel Medina
(74) Attorney, Agent, or Firm—John G. Tolomei; James C. Paschall

(57) ABSTRACT

A process for the purification of an inert gas recycled from a polymerization reactor is disclosed, comprising the steps of mixing the gas with oxygen or gas containing oxygen in stoichiometric quantity or in such an excess that the gas at the outlet of the catalyst bed contains no more than 250 ppm of oxygen, circulating the gas through a catalyst bed comprising platinum, which has been subjected to a reducing environment, at temperatures of no more than 300° C. (572° F.) and preferably no more than 250° C. (482° F.) and recycling the gas to the polymerization reactor.

20 Claims, 2 Drawing Sheets

PROCESS FOR THE PURIFICATION OF INERT GASES

FIELD OF THE INVENTION

The present invention relates to a process for the purification of an inert gas containing impurities formed of organic compounds. The invention further relates to a process for the purification of an inert gas recycled from a polymerization reactor and particularly a solid-state polycondensation (SSP) reactor for aromatic polyester resins.

BACKGROUND OF THE INVENTION

Polymer resins are molded into a variety of useful products. One such polymer resin is polyethylene terephthalate (PET) resin. It is well known that aromatic polyester resins, particularly PET, copolymers of terephthalic acid with lower proportions of isophthalic acid and polybutylene terephthalate are used in the production of beverage containers, films, fibers, packages and tire cord. U.S. Pat. No. 4,064,112 B1 discloses a solid-state polycondensation or polymerization (SSP) process for the production of PET resins.

While for fibers and films the intrinsic viscosity of the resin must generally be between 0.6 to 0.75 dl/g, higher values are necessary for molding materials such as containers and tire cord. Higher intrinsic viscosity such as greater than 0.75 dl/g can only with difficulty be obtained directly through polycondensation of molten PET, commonly called the melt phase process. The SSP process pushes polymerization to a higher degree thereby increasing the molecular weight of the polymer by the heating and removal of reaction products. The polymer with a higher molecular weight has greater mechanical strength and other properties useful for production of containers, fibers and films, for example.

An SSP process starts with polymer chips that are in an amorphous state. U.S. Pat. No. 4,064,112 B1 teaches crystallizing and heating the chips in a crystallizer vessel under agitation to a density of 1.403 to 1.415 g/cm³ and a temperature ranging between 230° and 245° C. (446° and 473° F.) before entering into the SSP reactor. Otherwise the tacky chips tend to stick together.

The SSP reactor may consist of a cylindrical reactive section containing a vertical mobile bed into which the polymer chips are introduced from above and a frusto-conical dispensing section at the base for dispensing the product chips. The polycondensation reactor typically operates at temperatures between 210° and 220° C. (410 and 428° F.).

Various reactions occur during polycondensation of PET. The main reaction that increases the molecular weight of PET is the elimination of the ethylene glycol group:

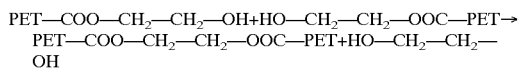
PET—COO—CH₂—CH₂—OH+HO—CH₂—CH₂—OOC—PET→
PET—COO—CH₂—CH₂—OOC—PET+HO—CH₂—CH₂—OH An inert gas such as nitrogen is run through the polymerization reactor to strip the developing polymer of the impurities. The impurities present in the inert gas stream used in the production of polyethylene terephthalate in an SSP process generally include water and organics such as aldehydes and glycols, typically acetaldehyde and ethylene glycol and glycol oligomers. Also, volatile impurities include low molecular weight PET oligomers, such as the cyclic trimer of PET. Water is removed from the inert gaseous stream before it is recycled to the SSP because it can precipitate a reversal of the polymerization process. The organic impurities are removed to strengthen the polymer product and to assure that the impurities do not taint the compatibility of the end product with its use. Especially important is the prevention of organic impurities from leaching out of a resin container into the beverage contents. These impurities are stripped from polymer chips and accumulate in the inert gaseous stream. The organic impurities are present in the inert gaseous stream to be purified, in quantities, defined as methane equivalent, of about 2000 to 3000 ppm or more. U.S. Pat. No. 5,708,124 B1 discloses maintaining the ratio of inert gas mass flow rate to PET polymer solids mass flow rate to below 0.6 in an SSP reactor.

It is also well known that polyamide resins, and among them particularly PA6, PA6,6, PA11, PA12 and their copolymers, find wide application both in the fiber and flexible packaging sectors, and in the manufactured articles production by blow and extrusion technology. While the resin relative viscosity for fibers is low at about 2.4 to 3.0, higher relative viscosities of 3.2 to 5.0 are needed for articles produced by blow and extrusion technologies. The relative viscosity is increased to above 3.0 by means of an SSP process operating at temperatures of between 140° and 230° C. (284° and 446° F.), depending on the polyamide types used. U.S. Pat. No. 4,460,762 B1 describes an SSP process for a polyamide and different methods to accelerate this reaction.

An SSP process for polyamide resins is also described in the article "Nylon 6 Polymerization in the Solid State," R. J. Gaymans et al., *Journal of Applied Polymer Science*, Vol. 27, 2515–2526 (1982) which points out the use of nitrogen as a heating and flushing aid. The reaction is carried out at 145° C. (293° F.).

It is also known that the molecular weight of polycarbonate can be increased through an SSP process. Developing polyamides and polycarbonates also emit organic impurities that must be purged by an inert gas stream that must then be purified.

EP 0 222 714 B1 discloses a method for making polyethylene terephthalate and polyethylene isophthalate with very low generation of acetaldehyde to reduce the amount of purification required of the inert gas.

The conventional method used for the purification of an inert gaseous stream recycled from an SSP process includes an oxidation step for converting the organic impurities to $CO_2$ and a drying step to eliminate the water formed in the polymerization process and the oxidation step. The oxidation step is carried out with oxygen or with gas containing oxygen, such as air, by using an oxygen concentration of no more than in slight excess of the stoichiometric quantity as regards the organic impurities. The oxidation step is controlled according to U.S. Pat. No. 5,612,011 B1 so that the inert gaseous stream at the outlet contains an oxygen concentration of not more than 250 ppm and preferably according to U.S. Pat. No. 5,547,652 B1 so that the inert gaseous stream at the outlet contains an oxygen concentration of not more than 10 ppm. These patents taught that a previously required deoxidation step of reducing the oxygen with hydrogen between the oxidation and drying steps was not required.

The oxidation reaction is conventionally carried out at a temperature between 250° and 600° C. (482° and 1112° F.) by circulating the inert gaseous stream over a catalyst bed formed of a support coated with platinum or platinum and palladium. The low oxygen content present in the inert gaseous stream exiting the oxidation section allows for recycling the same to the SSP process after the drying step. Moreover, higher oxygen concentrations in the recycled inert gaseous stream present the risk of oxidation reactions which degrade the polymer product, for example, by "yellowing" the product.

Japanese Publication 20885/71 discloses a method of reconstituting inert gas employed in the solid-state polycondensation or polymerization of linear polyesters comprising contacting the gas with one metal oxide at 150° to 300° C. (302° to 572° F.). The organic reaction products contained in the inert gas are oxidized to water and carbon dioxide. However, because the metal oxide loses its activity, it must be heated in the presence of air in a batch process. Accordingly, this publication does not pertain to a continuous catalytic gas purification process.

The last inert gas purifying step is a drying step carried out by circulating the gas over a silica gel, molecular sieves or other beds of drying materials. In this step, the water both stripped from polymer chips by the inert gas stream and generated in the oxidation step is eliminated. After this step, the inert gas is recycled to the SSP process. The small traces of oxygen, when present in the recycled inert gaseous stream, do not cause oxidation effects and/or polymer degradation. Even when the oxygen quantity in the oxidation reactor is stoichiometric or a little higher, it is possible to reduce the organic impurities to acceptable levels, such as less than 10 ppm defined as methane equivalent.

An article by E. V. Kuznetsova et al. entitled "Purification of Industrial is Vapor-Gas Discharges and Wastewaters by Vapor-Phase Catalytic Oxidation" discloses the use of platinum and other metal catalysts for the oxidation of organic substances in water vapor from a wastewater stream. The article indicated that as temperature went below 250° C. (482° F.), the degree of conversion of hydrocarbon substances is less than complete for the aluminum-copper oxide catalyst.

The platinum or platinum and palladium catalyst previously used in the purification of an inert gas from a polymerization process had to be run at 250° to 600° C. (482° to 1112° F.) to ensure adequate oxidation of the hydrocarbon impurities from the nitrogen gas stream when substantially stoichiometric quantities of oxygen are used. The higher temperature used in the reaction zone requires relatively costlier equipment and operation to preheat the impure inert gaseous stream fed into the oxidation zone. Moreover, greater equipment and operation costs were necessary to recover heat from the oxidation step.

Accordingly, an object of the invention is to provide a catalyst that will oxidize nearly all of the organic impurities from an inert polymerization reactor purge stream with substantially stoichiometric quantities of oxygen at lower temperatures.

SUMMARY OF THE INVENTION

It has been unexpectedly found that catalysts of 0.1 to 2.0 wt-% platinum in which the platinum is in a reduced state nearly completely oxidizes organic impurities from a polymerization reaction with a substantially stoichiometric quantity of oxygen at much lower temperatures than previously practiced, namely, below 250° C. (482° F.).

Accordingly, in one embodiment, the present invention relates to a process for the purification of a recycle inert gas stream leaving a polymerization reactor from organic impurities. The process comprises adding oxygen or a gas containing oxygen to the gas stream. The gas stream is contacted with a catalyst containing platinum, which has been subjected to reduction, at a reaction temperature of less than 300° C. (572° F.) in a reactor. The quantity of oxygen added is substantially stoichiometric with respect to the organic impurities such that a gas effluent from the reactor contains no greater than 250 ppm oxygen. The gas effluent leaving the oxidation reactor is dried to remove water from the gas effluent. The gas effluent is then recycled to the polymerization reactor.

In another embodiment, the present invention relates to a process for the purification of a recycle inert gas stream leaving a polymerization reactor from organic impurities. The process comprises adding oxygen or gas containing oxygen to the gas stream. The gas stream is contacted with a catalyst containing platinum in a substantially reduced state on a support at a reaction temperature of less than 300° C. (572° F.) in a reactor. The quantity of oxygen added is substantially stoichiometric with respect to the organic impurities such that a gas effluent from the reactor contains no greater than 100 ppm oxygen. The gas effluent leaving the oxidation reactor is dried to remove water from the gas effluent. The gas effluent is then recycled to the polymerization reactor.

In a further embodiment, the present invention relates to a process for the purification of a recycle inert gas stream leaving a polymerization reactor from organic impurities. The process comprises adding oxygen or gas containing oxygen to the gas stream. The gas stream is contacted with a catalyst containing platinum, which has been subjected to reduction, at a reaction temperature of less than 250° C. (482° F.) in a reactor. The quantity of oxygen added is substantially stoichiometric with respect to the organic impurities such that a gas effluent from the reactor contains no greater than 10 ppm oxygen. The gas effluent is then recycled to the polymerization reactor.

Additional objects, embodiments and details of this invention can be obtained from the following detailed description of the invention.

DETAILED DESCRIPTION OF THE INVENTION

A detailed description of a preferred method of carrying out the process is given in the context of a solid-state polycondensation or polymerization (SSP) process. However, the present invention can be used with other types of polymerization processes, such as for polyamide and polycarbonate, in which impurities are purged from the polymerization with inert gas and the impurities are oxidizable, especially to carbon dioxide and water. Polyester resins usable in the SSP process are products of polycondensation of aromatic bicarboxylic acid, particularly terephthalic acid or its esters with diols with 1 to 12 carbon atoms such as ethylene glycol, 1,4-dimethylolcyclohexane and 1,4-butanediol. Polyethylene terephthalate (PET) and polybutylene terephthalate are the preferred resins. Polyester resins usable in the SSP process also may include elastomeric polyester resins, including segments deriving from polyethylene glycol, and copolyesters containing up to 20% of units deriving from aromatic bicarboxylic acids different from terephthalic acid, such as isophthalic acid. The resins to be subjected to SSP can contain a resin-upgrading additive to accelerate the SSP reaction. The preferred upgrading compounds are the dianhydrides of tetracarboxylic aromatic acids, and particularly pyromellitic dianhydride. The upgrading agent is generally used in a quantity of about 0.05 to 2% by weight. Conventional additives, like stabilizers, dyes, flame retardants and nucleants can also be present in the resin. Polyester resins useful for upgrading in SSP processes can also be material produced from recycled containers which have been washed, shredded and dried. Typically, the recycled material is remelted and pelletized before being sent to the SSP process.

Polyamide resins usable in the process of the invention include polyamide 6 derived from caprolactam, polyamide 6,6 obtained from hexamethylenediamine and adipic acid, polyamide 11 obtained from aminoundecanoic acid, and 12 polylaurilacetone copolyamides 6/10 and 10/12 and also polyamides of metaxylene diamine.

Polycarbonate may also be used in the process of the present invention.

Figure 1:
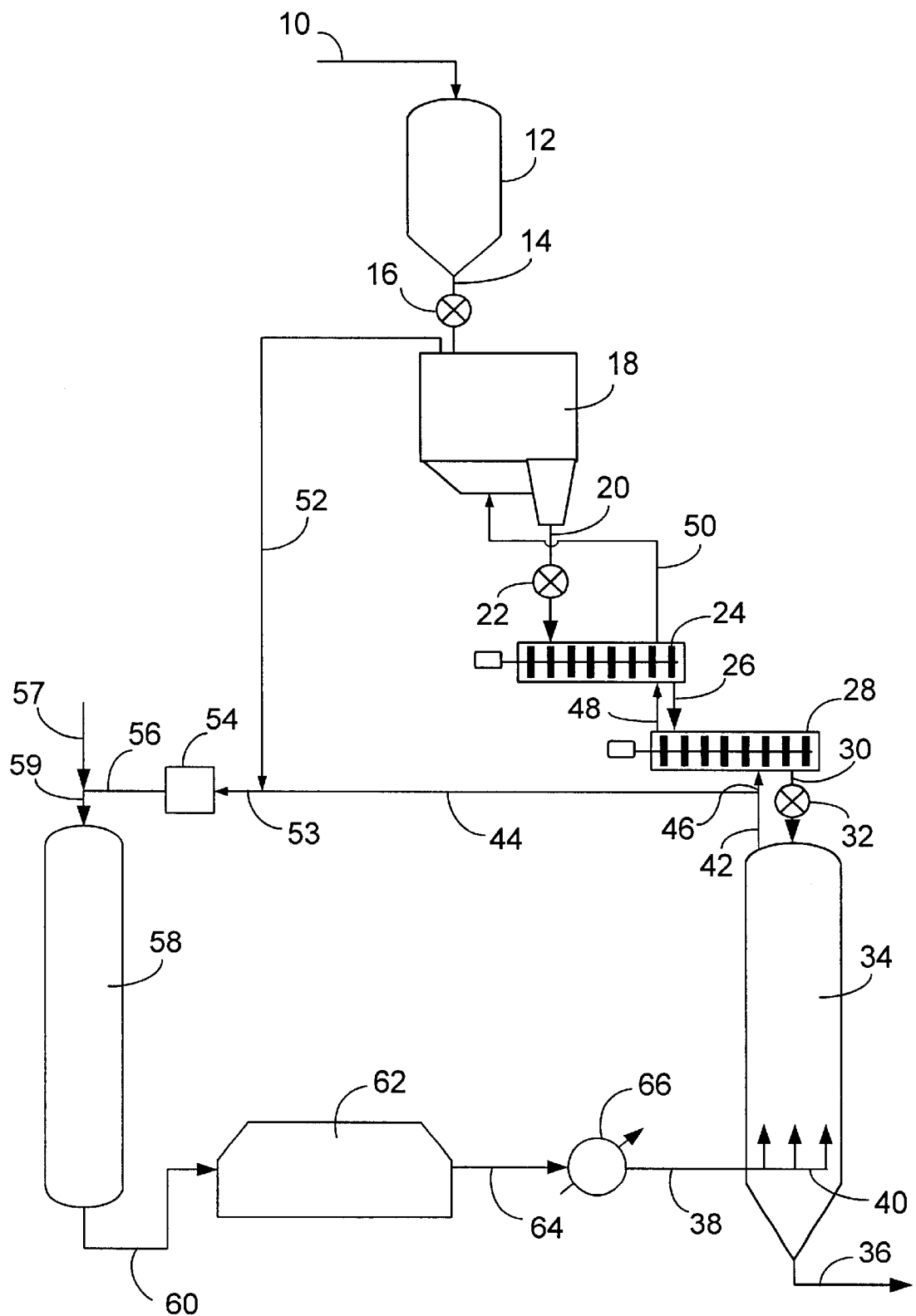
FIG. 1 is a schematic view of a polymerization flow scheme in which the present invention may be used.

Referring to FIG. 1, the polyester SSP process to which the present invention can be applied comprises feeding amorphous, clear polyester chips having an intrinsic viscosity usually ranging from about 0.57 to 0.65 dl/g to a hopper 12 through a line 10. The intrinsic viscosity or molecular weight of the starting material is immaterial to the practice of the invention. Generally, the SSP process can be successfully performed with feeds across a wide range of values. For example, techniques are disclosed for using a starting material having a degree of polymerization as low as 2–40 by U.S. Pat. No. 5,540,868 B1, U.S. Pat. No. 5,633,018 B1 and U.S. Pat. No. 5,744,074 B1 which contemplate eventually undergoing SSP processing to raise the molecular weight sufficient to make useful resins. Also, the starting intrinsic viscosity in the case of post-consumer recycle material can be at levels of above 0.65 dl/g. The hopper 12 feeds the chips through a line 14 and a control valve 16 to a fluidized bed pre-crystallizer 18. The pre-crystallizer 18 operates at about 170° C. (338° F.) and 10.3 kPa gauge (1.5 psig) to achieve about 35% crystallinity of the polyester chips. The polyester chips are then fed from the pre-crystallizer 18 through a line 20 and a control valve 22 into a first crystallizer 24. If more capacity is necessary, a second crystallizer 28 may be utilized which the first crystallizer 24 feeds through line 26. In the crystallizers 24, 28, the chips are eventually preheated or cooled in some cases to an SSP reaction temperature while being subjected to mechanical agitation to prevent the chips from sticking to each other. The chips leaving the crystallizer will exhibit about 45% crystallinity. Crystallizing PET granules prior to polycondensation prevents the granules from sticking during the SSP reaction.

The chips leaving the crystallizer(s) are then fed through a line 30 and a control valve 32 to a moving, packed bed polymerization reactor 34 that can be operated suitably at 150° to 240° C. (302° to 464° F.) and preferably at 210° to 220° C. (410° to 428° F.) for PET. The chips move by gravity through the moving bed for about 12 to 36 hours to yield crystalline, opaque pellets with an intrinsic viscosity of 0.75 dl/g or greater depending upon the application to which the polyester pellets will be put. The chips are withdrawn from the reactor 34 through a line 36.

An oxygen-free inert gas, typically nitrogen, purges the polymerization reactor, the crystallizers and the pre-crystallizer to remove impurities given off by the chips. The inert gas is delivered through a line 38 and is distributed into the polymerization reactor 34 by a distributor 40. The ratio of the mass flow rate of inert gas to the mass flow rate of polymer preferably should not exceed 0.6 in the reactor 34 if PET is the product. A gas line 42 removes inert gas with impurities from the reactor 34 and splits into a recycle line 44 and a crystallizer line 46. The crystallizer line 46 delivers the inert gas to the second crystallizer 28 and a line 48 delivers inert gas from the second crystallizer 28 to the first crystallizer 24. A line 50 delivers inert gas with impurities to the pre-crystallizer 18 and a line 52 delivers inert gas with impurities to join the recycle line 44. The inert gas recycled in a combined recycle line 53 is preferably at a temperature between 200° and 220° C. (392° and 428° F.).

The combined recycle line 53 runs the inert gas with impurities through a filter 54. After the recycled inert gaseous stream is filtered, air is injected by a line 57 into a line 56 exiting the filter 54. The air/inert gaseous mixture is carried by a line 59 through a heater (not shown), if necessary to achieve the desired oxidation reaction temperature, into an oxidation reactor 58, where the organic impurities are combusted by circulating the stream over a catalyst bed including the reduced platinum containing catalyst according to the present invention. Oxygen is injected by line 57 in substantially stoichiometric quantities to assure the complete combustion of the organic impurities in oxidation reactor 58, tolerating a maximum excess of no greater than 250 ppm, suitably no greater than 100 ppm and preferably no greater than about 10 ppm of oxygen at the outlet of the reactor 58. The oxidation reactor 58 can be operated with these conversions at temperatures below 350° C. (662° F.). However, because lower temperature operation is more economical, the oxidation reactor 58 will preferably operate below 250° C. (482° F.) which is the unheated temperature of the inlet stream in line 59. Hence, the heater in line 59 is obviated. A line 60 withdraws the effluent from the oxidation reactor 58 that contains only nitrogen, carbon dioxide, water and traces of oxygen. The carbon dioxide content stabilizes at a certain level due to the losses through the SSP plant and acts like an inert gas due to its chemical inertia. The exiting gaseous stream in the line 60 may be circulated through a heat exchanger (not shown) for heat recovery or to condense and dispose of part of the water by cooling the oxidation reactor effluent by about 10° to 15° C. The cooling step may be omitted because economics may not demand heat recovery from a relatively lower temperature inert gaseous stream in which case condensation may already occur. No optional condensation collection equipment is shown in the drawings. The gaseous stream is delivered by the line 60 to a dryer 62 preferably operating at 200° C. (392° F.). The dryer 62 preferably contains molecular sieves for adsorbing the water. The effluent of the dryer 62 is transported through line 64 to a heater 66 after having been filtered (not shown) of possible particles deriving from the molecular sieves. The heater 66 heats the gaseous stream to a temperature commensurate with the reactor 34 and recycles the gaseous stream to the reactor 34 through the line 38. The regeneration of the molecular sieves bed is performed according to known methods, operating for example on a closed circuit with a hot nitrogen stream (not shown).

The catalyst used in the oxidation reactor 58 is a platinum and palladium or substantially all platinum catalyst of as much as 5.0 wt-%, suitably 0.1 to 2.0 wt-% and preferably 0.2 to 0.8 wt-% of the catalyst based on the total weight of the product catalyst in which the platinum is in a substantially reduced state. We have found that by providing a catalyst with a platinum in a reduced state allows for the oxidation of the organic impurities to take place at temperatures much lower than previously practiced; that is, at or below 250° C. (482° F.). By the term "substantially reduced", we mean that at least 70 wt-% of the platinum in the catalyst is platinum metal as opposed to platinum oxide. Suitably, at least 90 wt-% of the platinum in the catalyst is platinum metal, and preferably, all of the platinum on the catalyst is reduced.

Although not wishing to be bound by any theory, we believe reducing the platinum to metal with a valance state of zero from four or two in the oxidized state provides significantly greater oxidative activity to the catalyst at lower temperatures. Additionally, the platinum is distributed on the very outer surface of the support comprising an eggshell around the support and giving it a greater activity. Hence, greater than 90 wt-% of the platinum on the catalyst is present at less than 100 µm in depth from the surface of the catalyst. This is very important for the oxidation reaction which is highly diffusion limited.

The support for the catalyst may be an alumina made using either the teachings of U.S. Pat. No. 4,108,971 B1 or U.S. Pat. No. 4,301,033 B1, which are both incorporated herein by reference. It may be preferable to use a catalyst support with a higher apparent bulk density such as above 0.3 and as high as 0.7 g/cc made pursuant to the teachings of U.S. Pat. No. 4,301,033 B1 because we believe the amount of supported platinum is proportional to the apparent bulk density of the support.

It is contemplated that promoters and additives may enhance the effectiveness of the catalyst. Additionally, if the catalyst is made to contain more reduced platinum, the reaction temperatures may be decreased even more. Other platinum group metals from the second and third rows of Group VIII of the Periodic Table of Elements in a reduced valence state may also operate advantageously in the context of the present invention. Lastly, it is contemplated that the catalyst of the present invention may be regenerated in situ by carbon removal with known methods The following examples are given to illustrate and not to limit the invention.

EXAMPLE I

The catalyst of the present invention was prepared in the following manner. A 100 milliliter solution of 4.5 wt-% chloroplatinic acid, containing 20 wt-% platinum and 0.69 wt-% thiomalic acid in deionized water was mixed and stirred for 1 hour in a flask. The solution was aged for 48 hours at room temperature and then adjusted to a volume of 600 milliliters with deionized water. Five hundred milliliters of activated alumina spheres having a apparent bulk density of 0.40 g/cc, a crush strength of 8.0 kg (17 pounds), an average diameter of 3.2 mm and a BET surface area of 165 m$^2$/g was poured into a flask of the aged chloroplatinic acid solution. The flask was connected to a rotary evaporator and dipped into a boiling water bath to evaporate the solution under slightly vacuum conditions for 4 hours under rotation. The impregnated spheres were then dried at 150° C. (302° F.) for 2 hours in an air flowing oven and oxidized at 500° C. (932° F.) for 1 hour in the same oven. The oxidized spheres were then loaded into a reduction reactor and heated to 200° C. (392° F.) under nitrogen flow for 1 hour. The flow was switched from nitrogen to hydrogen and heated to 500° C. (932° F.) for 1 hour. Then the reactor was cooled down to less than 200° C. (392° F.) and the flow was switched from hydrogen to nitrogen. The prepared catalyst ready to be loaded into the oxidation reactor had a platinum content of 0.45 wt-% and all of the platinum was in the reduced state.

EXAMPLE II

Figure 2:
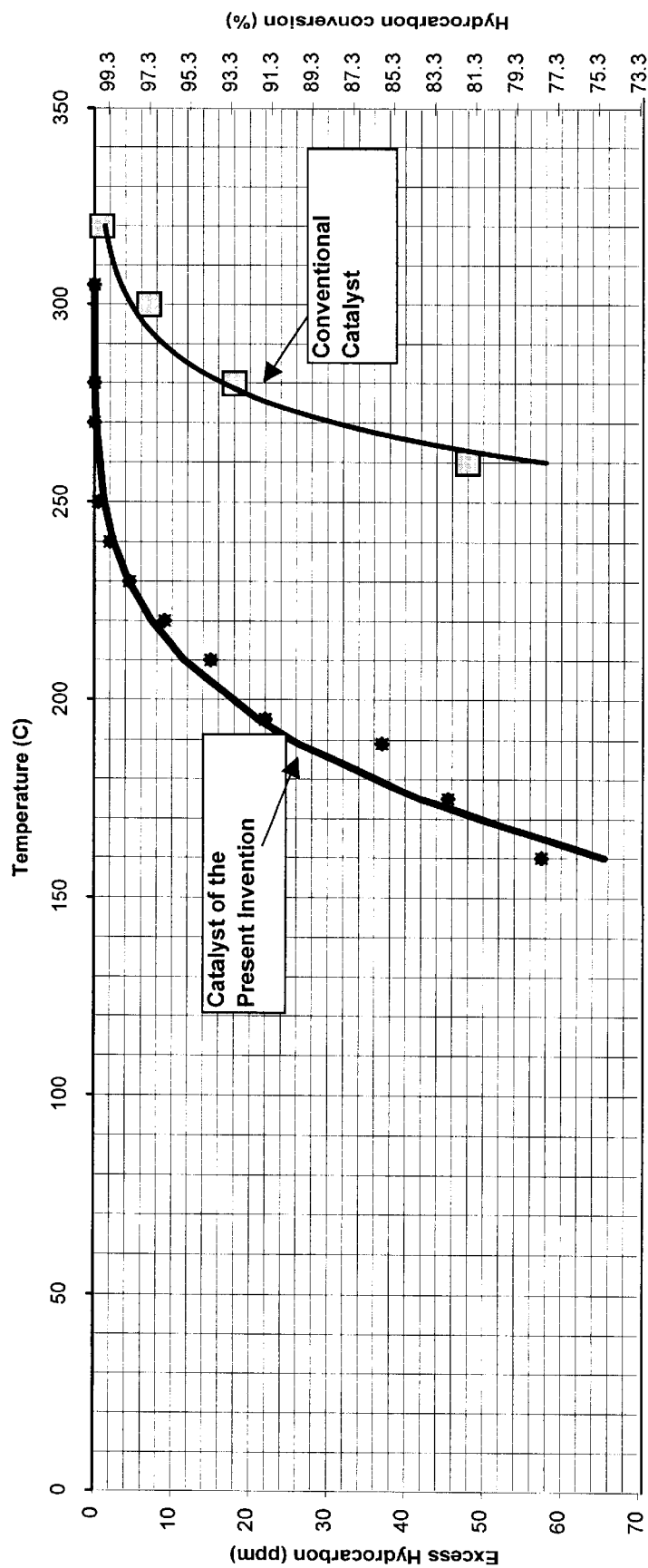
FIG. 2 is a plot comparing performance of a conventional catalyst and a catalyst of the present invention.

The performance of the new catalyst with reduced platinum compared to the performance of a conventional platinum catalyst which was not reduced is shown in FIG. 2. FIG. 2 plots the percentage of hydrocarbon conversion versus temperature. Each catalyst was tested in a fully-integrated SSP demonstration in which 907 kg (1 ton) per day of base PET resin was upgraded from a starting intrinsic viscosity of 0.58 dl/g to a final intrinsic viscosity of 0.80 to 0.81 dl/g. The SSP process comprised a reaction section through which 43 to 45 kg/hr of base granular resin was upgraded at 210° C. (410° F.) with 25 kg/hr nitrogen. The used nitrogen was then heated electrically and sent to either of two test reactors containing conventional catalyst and the catalyst of the invention. The gas rate corresponded to a gas hourly space velocity (GHSV) of about 5000 hr$^{-1}$ in the catalytic reactors. The gas leaving the reactor was cooled by heat exchange to 60° C. (140° F.), de-watered, sent to a desiccating dryer containing molecular sieves and dried to a gas dew point of less than −60° C. (−76° F.). In all cases, the reaction was controlled at close to stoichiometric levels of less than 10 ppm oxygen by addition of clean, dry air to the reaction vessel by control of an oxygen analyzer. An on-line hydrocarbon analyzer was used to monitor the conversion. The base PET resin was a PET and isophthalate copolymer suitable for containers. The properties were as follows:

| Base Resin | |
|---|---|
| Intrinsic Viscosity, ASTM D-4603 (dl/g) | 0.58 |
| Terephthalic Acid and Ethylene Glycol (wt-%) | 96.8 |
| Diethylene Glycol (wt-%) | 1.4 |
| Isophthalic Acid (wt-%) | 1.8 |
| Antimony (ppm) | 245 |
| Phosphorus (ppm) | 14 |
| Size of Granules (mg/particle) | 14 |

The catalyst of the present invention achieves better hydrocarbon conversion at lower temperatures than the conventional catalyst without reduced platinum. The plot indicates that the catalyst of the present invention achieves hydrocarbon conversion of all but 10 ppm at just over 210° C. (410° F.) and hydrocarbon conversion of all but 1 ppm at just over 240° C. (464° F.). The conventional catalyst requires temperatures just under 290° C. (554° F.) and 310° C. (590° F.), respectively, to obtain the same hydrocarbon conversion. The catalyst of the present invention achieved complete conversion with no remaining hydrocarbons at 270° C. (518° F.). Hence, the catalyst can be run at temperatures upwards of 250° C. (482° F.) when greater conversion is needed or when activity has diminished over use.

What is claimed is:

1. A process for the purification of a recycle inert gas stream leaving a polymerization reactor from organic impurities, comprising:

adding oxygen or a gas containing oxygen to said gas stream;

contacting said gas stream with a catalyst impregnated with a metal including platinum, which has been subjected to reduction such that all of said metal impregnated on said catalyst is in a substantially reduced state, at a reaction temperature of less than 300° C. (572° F.) in an oxidation reactor wherein the quantity of oxygen added is substantially stoichiometric with respect to the organic impurities such that a gas effluent from the oxidation reactor contains no greater than 250 ppm oxygen;

drying said gas effluent leaving the oxidation reactor to remove water from said gas effluent; and recycling said gas effluent to the polymerization reactor.

2. The process of claim 1 wherein the polymerization reactor is a solid-state polycondensation or polymerization reactor for aromatic polyester resins.

3. The process of claim 1 wherein the reaction temperature is no more than 250° C. (482° F.).

4. The process of claim 1 wherein the inert gas is nitrogen or includes nitrogen.

5. The process of claim 1 wherein a support for the catalyst comprises an activated alumina.

6. The process of claim 1 wherein at least 90 wt-% of the platinum in said catalyst is in a reduced state.

7. The process of claim 1 wherein the catalyst includes 0.1 to 2.0 wt-% platinum.

8. The process of claim 1 wherein the catalyst is reduced in a gas containing hydrogen.

9. The process of claim 1 wherein the platinum is dispersed on the surface of the catalyst.

10. The process of claim 1 wherein the effluent from the oxidation reactor contains no greater than 10 ppm of oxygen.

11. A process for the purification of a recycle inert gas stream leaving a polymerization reactor from organic impurities, comprising:

adding oxygen or gas containing oxygen to said gas stream;

contacting said gas stream with a catalyst containing platinum in a substantially reduced state on a support at a reaction temperature of less than 300° C. (572° F.) in an oxidation reactor wherein the quantity of oxygen added is substantially stoichiometric with respect to the organic impurities such that a gas effluent from the oxidation reactor contains no greater than 250 ppm oxygen and 1 ppm organic impurities;

drying said gas effluent leaving the oxidation reactor to remove water from said gas effluent; and recycling said gas effluent to the polymerization reactor.

12. The process of claim 11 wherein the polymerization reactor is a solid-state polycondensation or polymerization reactor of aromatic polyester resins.

13. The process of claim 11 wherein the reaction temperature is no more than 250° C. (482° F.).

14. The process of claim 11 wherein the inert gas is nitrogen or includes nitrogen.

15. The process of claim 11 wherein the support is an activated alumina.

16. The process of claim 11 wherein said catalyst includes an additive or a promoter.

17. The process of claim 11 wherein said catalyst includes 0.1 to 2.0 wt-% platinum.

18. The process of claim 11 wherein the catalyst is reduced in a hydrogen environment.

19. The process of claim 11 wherein the effluent from the oxidation reactor contains no greater than 10 ppm of oxygen.

20. A process for the purification of a recycle inert gas stream leaving a polymerization reactor from organic impurities, comprising:

adding oxygen or gas containing oxygen to said gas stream;

contacting said gas stream with a catalyst impregnated with a metal including platinum, 90% of said metal being in a reduced state, at a reaction temperature of less than 250° C. (482° F.) in an oxidation reactor wherein the quantity of oxygen added is substantially stoichiometric with respect to the organic impurities such that a gas effluent from the oxidation reactor contains no greater than 250 ppm oxygen; and recycling said gas effluent to the polymerization reactor.

* * * * *